United States Patent
Allen

[19]

[11] Patent Number: 6,062,761
[45] Date of Patent: May 16, 2000

[54] CONNECTOR FOR SQUARE OR RECTANGULAR STRUCTURAL TUBING

[76] Inventor: Stuart Vernon Allen, 7233 Hanna St., Gilroy, Calif. 95020

[21] Appl. No.: 09/071,727

[22] Filed: May 1, 1998

[51] Int. Cl.[7] ............................................. F16B 2/04
[52] U.S. Cl. ...................... 403/170; 403/297; 403/409.1
[58] Field of Search ............................ 63/297, 403, 205, 63/170, 171, 172, 174, 176, 217, 218, 219, 409.1; 52/655.1

[56] References Cited

U.S. PATENT DOCUMENTS

| | | | |
|---|---|---|---|
| 3,701,553 | 10/1972 | Vogt | 403/217 X |
| 3,901,613 | 8/1975 | Andersson | 403/171 X |
| 5,605,410 | 2/1997 | Pantev | 403/297 |
| 5,743,670 | 4/1998 | Ader | 403/170 X |
| 5,839,248 | 11/1998 | Liang | 403/171 X |
| 5,904,437 | 5/1999 | Allen | 403/170 |

FOREIGN PATENT DOCUMENTS

| | | | |
|---|---|---|---|
| 2292145 | 6/1976 | France | 403/297 |
| 441871 | 1/1968 | Switzerland | 403/174 |
| 438848 | 12/1969 | Switzerland | 403/171 |

*Primary Examiner*—Harry C. Kim

[57] ABSTRACT

A connector for standard commercial square or rectangular tubing. The connector consists of a cubic or otherwise appropriately shaped block with projecting sections in each direction where tubing is intended to be connected. The projecting sections fit loosely inside the tubing. Each projection has internal cams that drive radial pins outward to engage the inner surface of the tubing. Cam movement is accomplished by a screw perpendicular to the axis of the tubing.

5 Claims, 3 Drawing Sheets

CONNECTOR FOR SQUARE OR RECTANGULAR STRUCTURAL TUBING

FIELD OF THE INVENTION

This invention relates generally to connectors for square or rectangular tubing and specifically to connectors that may be inserted loosely into unmodified tubing, mechanically tightened to form a rigid, precisely aligned joint, and then mechanically disassembled to allow modification or reuse of the connector and/or tubing.

DESCRIPTION OF THE PRIOR ART

Commercially available structural framing systems fall into three categories. The first category is welded frames where inexpensive, standardized structural materials, including square and rectangular structural tubing, are machined, aligned, and permanently welded into the desired shape. Welded frames have great strength, can be accurately arranged into virtually any imaginable shape, and have low material costs. However, the specialized labor and equipment required to fabricate the frames is expensive, and, once welded, the frames are difficult to modify and are not generally considered reusable.

A second type of structural framing system consists of custom extruded aluminum or rolled steel beams and a wide variety of connecting brackets, hardware, and accessories. The beams include features to allow easy attachment and are easily assembled and disassembled for reuse. However, strength is limited and the custom beams are expensive relative to the standardized structural shapes typically used in the welded frames described above. Extruded framing systems can also be difficult to align accurately when frame members are slideably attached to other members.

The third category of framing system is exemplified by U.S. Pat. No. 5,556,218 by Homer, September 1996. The system consists of connectors that are designed to be used with standard square and rectangular structural tubing. The connectors have projections that fit inside the tubing and expanding elements that are compressed against the inner side of the square or rectangular to form a tight joint. There are two types of connectors that may be differentiated by the type of expanding element used to secure the tubing. In one type, each projection has a wedge block and a screw that is used to pull the wedge block against an inclined surface, forcing the wedge surface to deform outward to engage the inside of tubing and lock the tubing in place. The second type has sliding pins that are driven out against the inner wall of the tubing by a rotating cam.

Wedge block connector systems have joints that can be as strong as welded frames, are easily assembled or disassembled, and use inexpensive standardized structural tubing. Prior art wedge block tubing connectors have limited ability to accommodate the wide dimensional tolerances of standard commercial structural tubing. Because of the limited expansion capability of a wedge system, a given connector is only useable for a small portion of the wide range of tubing wall thicknesses that are commercially available. A single wedge block per connector projection provides limited angular alignment stiffness. And, finally, prior art wedge block connectors retain the structural tubing by friction alone and may therefore have limited reliability when used for frames that are exposed to vibration or extremes of temperature.

Rotary, cam-driven pin connectors have a relatively wide range of motion that allows the same connector to be used with tubing having many different wall thicknesses. The pins may engage the inside of the structural tubing in two planes, or the pins may be long enough to provide accurate angular alignment of the square or rectangular structural tubing. The pins may have teeth that are able to penetrate the inner wall of the tubing to provide increased tensile strength and/or increased resistance to loosening when exposed to vibration or extremes of temperature. Rotary cam type sliding pin connector systems require gear teeth that are relatively expensive to fabricate. The gear teeth have less strength than standard screw threads and may limit the compressive force that can be exerted on the tubing by the expanding pins. Finally, gear teeth for a rotary cam may be less resistant to loosening by vibration or temperature extremes.

SUMMARY OF THE PRESENT INVENTION

It is an object of the present invention to provide a connector for use in structural framing with standard commercial square or rectangular tubing that allows easy assembly or disassembly of the frame with standard tools, and that has strength comparable to that of the tubing.

It is a further object of the present invention to provide a structural tubing connector that provides accurate linear and angular alignment of the tubing.

Another object of the present invention is to provide a connector that is usable with a wide range of tubing wall thicknesses.

Still another object of the invention is to provide a connector that secures the tubing by penetrating and deforming the interior surface of the tubing to provide a joint that is resistant to loosening by vibration or by extremes of temperature.

A final object of the present invention is to provide a cam driven pin type connector that is less expensive to fabricate than prior art structural tubing connectors but provides greater clamping force and superior resistance to vibration loosening and temperature extremes.

These and other objects are achieved according to the present invention which consists of a structural tubing connector having a central block with exterior dimensions matching the exterior dimensions of the tubing and with some faces oriented perpendicular to the desired directions of the tubing to be connected. Each of the faces to which tubing is to be connected has a projection along the axis of the tubing. Each of the projections has two sections, a section adjacent to the central block with exterior dimensions matching those of the tubing and another, usually longer, distal section with exterior dimensions that allow it to fit loosely inside the tubing to be connected.

Both sections of the projection have a central circular bore containing an axial cam means slideably retained therein and a transverse cam means also slideably retained therein. The transverse cam means is located adjacent to the central block; the axial cam means is located distal to the central block. The distal section of the projection also has radial holes containing pin means slideably retained therein. The pin means may either be separated along the axis of the tubing into two widely spaced transverse planes or may be single pins sufficiently elongated in the tubing longitudinal direction to provide angular restraint for the tubing. Each pin means may have a resilient means that acts to preload the pin in a direction parallel to the axis of the structural tubing and away from the central block of the connector. The section of the projection adjacent to the central block has a screw means transverse to the axis of the tubing. The screw means acts to move the transverse cam means within the central bore in a direction perpendicular to the axis of the tubing.

The transverse cam means has an inclined surface that engages the axial cam means and causes the axial cam means to move parallel to the axis of the tubing, also within the central bore. The axial cam means in turn engages the radial pin means in the distal section and pushes the pin means radially outward to engage the tubing with sufficient force to deform the interior surface of the tubing.

The structural tubing is assembled to the connector by sliding the open end of the tubing over one of the projections until it engages the outer surface of the section of the projection adjacent to the central block. The screw means is then actuated to move the transverse cam means, which in turn moves the axial cam means, pushing the pins out to engage and partially penetrate the interior surface of the tubing. The connector joint may be disassembled by using the screw means to move the transverse cam means such that pressure is removed from the axial cam means. The axial cam means is then able to retract toward the central block and allow the pins to relax their engagement with the structural tubing.

As is apparent to one skilled in the art, the connector of the present invention may be made of many different materials appropriate to the tubing to be connected, may have many different numbers and orientations of projections for tubing connections, may have different numbers, shapes, or locations of pins, may have different shapes for the cam means, or may have different screw means to move the cam means and still fall within the true scope and spirit of the invention.

BRIEF DESCRIPTION OF THE DRAWINGS

FIG. 1 is an isometric view of the preferred embodiment of a 90° elbow with cutaways showing the internal parts.

FIG. 2 is a section view of the preferred embodiment taken perpendicular to the tubing axis through the distal section of a connector projection showing the central bore, axial cam, and radial pins.

FIG. 3 is a section view of the preferred embodiment taken parallel to the axis of the tubing on a plane through the screw means showing the connector projection, central bore, axial cam in retracted position, transverse cam in starting position, and the screw means.

FIG. 4 is a section view of the preferred embodiment taken parallel to the axis of the tubing on a plane through the screw means showing the connector projection, central bore, axial cam fully extended, transverse cam at the limit of travel, and the screw means.

FIG. 5 is a section view of the preferred embodiment taken parallel to the tubing axis on a plane through two of the radial pins showing the connector projection, central bore, axial cam in retracted position, transverse cam in starting position, screw means, two of the radial pins in retracted position, and the resilient radial pin preload element.

FIG. 6 is a section view of the preferred embodiment taken parallel to the tubing axis on a plane through two of the radial pins showing the connector projection, central bore, axial cam in extended position, transverse cam at the limit of travel, screw means, two of the radial pins in extended position, and the resilient radial pin preload element.

DESCRIPTION OF THE PREFERRED EMBODIMENT

Figure 1:
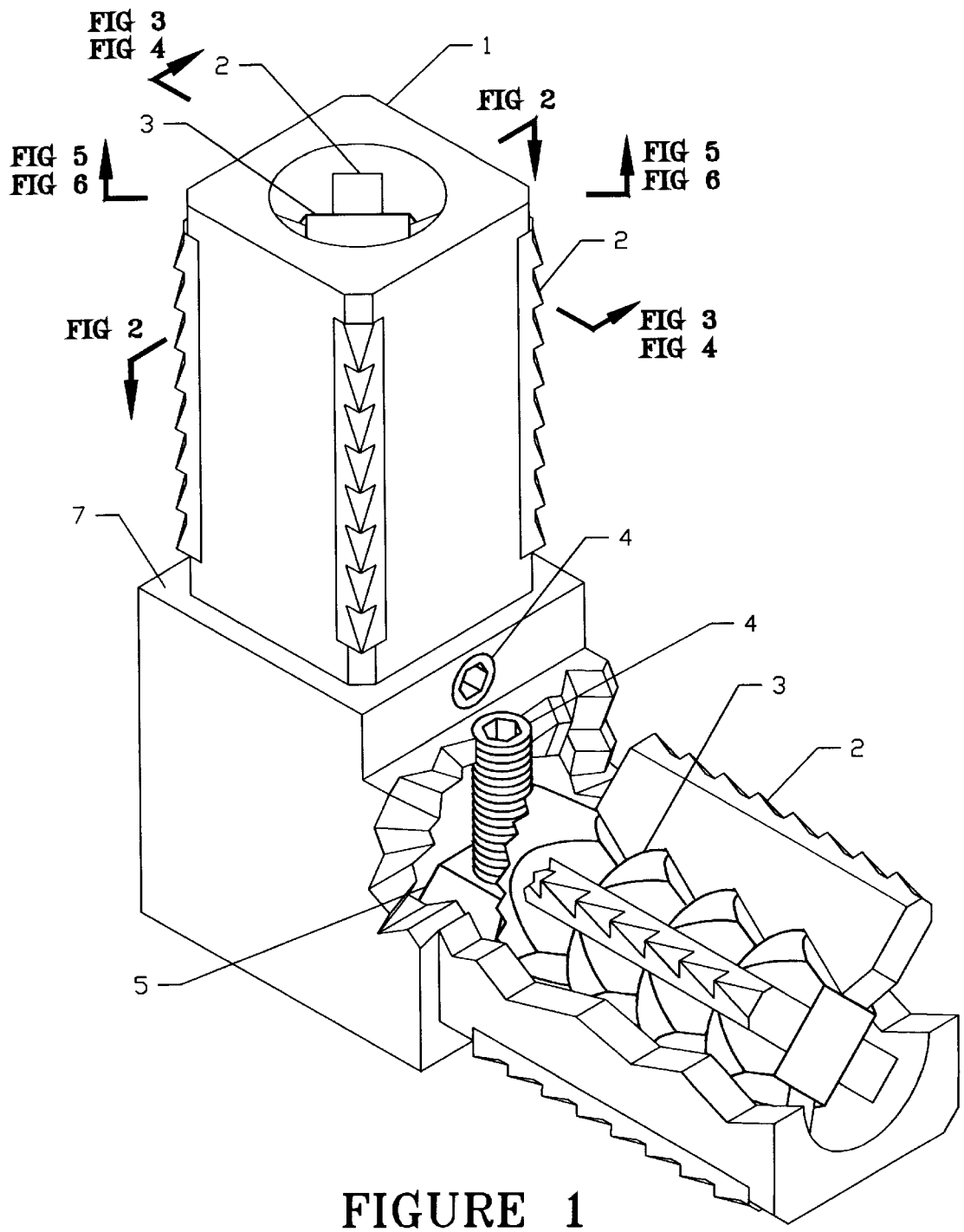
FIGS. 1 through 6 show the preferred embodiment of the invention.
Figure 2:
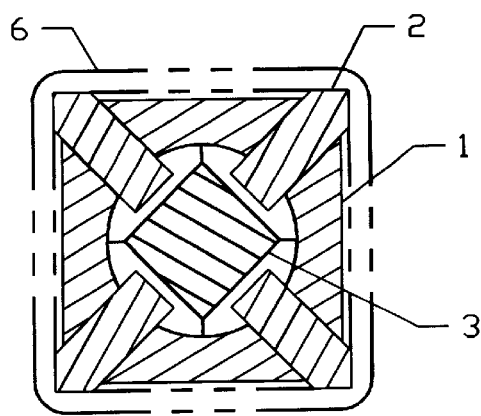
Figure 3:
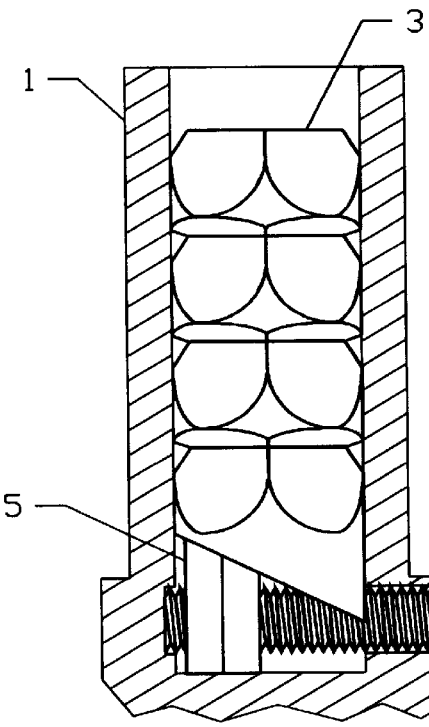
Figure 4:
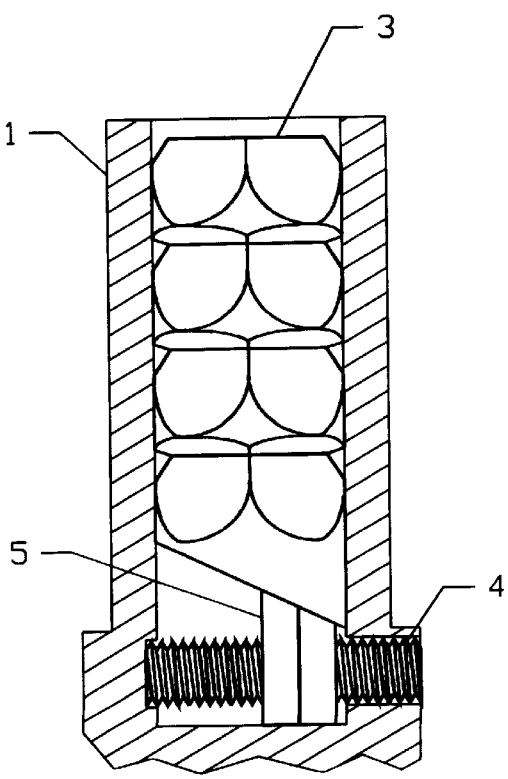
Figure 5:
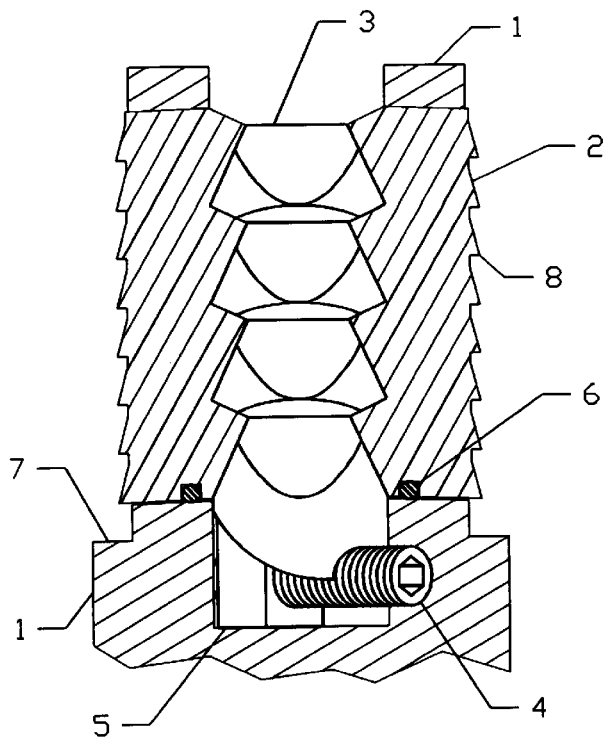
Figure 6:
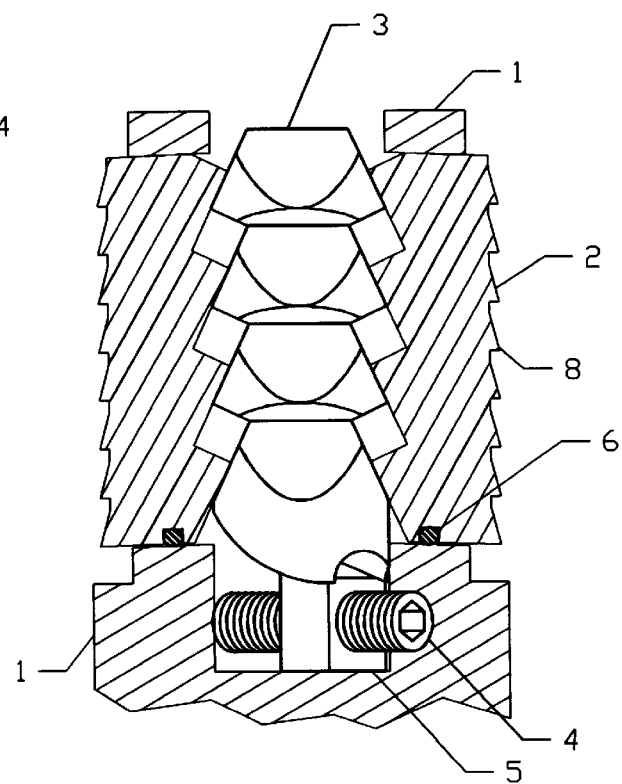

FIGS. 1 through 6 show the preferred embodiment of the present invention. The invention is comprised of a connector body 1 with stepped projections in each direction where tubing is to be attached and, in each projection, four radial pins 2 slideably fitted into slots in the connector body, an axial cam 3 slideably fitted into a bore in the connector body and engaging the four radial pins 2, a transverse cam 5 slideably fitted into the same bore in the connector body and engaging the axial cam 3, and a screw means 4 that engages and causes to move the transverse cam means 5. Each radial pin 2 may have a resilient means 6 to preload the pin 2 outward from the intersection of the connector body 1 projections.

To assemble a frame joint, commercial square or rectangular tubing is fitted over the appropriate projection and pressed toward the center of the connector body 1 until it hits the step in the projection 7. Screw means 4 is actuated to move transverse cam 5 perpendicular to the axis of the tubing. An inclined plane on transverse cam 5 engages a similar inclined surface on axial cam 3 and causes axial cam 3 to move parallel to the axis of the tubing in a direction outward from the intersection of the connector body 1 projections. Other inclined surfaces on axial cam 3 engage similarly inclined surfaces on radial pins 2, causing radial pins 2 to move outward to engage and press against the inner surface of the square or rectangular tubing. Points 8 on the outer surface of radial pins 2 penetrate the inner surface of the square or rectangular tubing to increase the strength of the joint. The tubing is secured to the connector by a combination of the penetration of the points 8 and the pressure of the outer surface of the radial pins 2.

Whereas, the preferred and other embodiments of the present invention have been described above, it is contemplated that other alternatives and modifications may become apparent to those skilled in the art after having read this disclosure. It is therefore intended that the appended claims be interpreted as covering all such alterations and modifications as fall within the true spirit and scope of the invention.

I claim:

1. A connector for joining standard commercial square or rectangular structural tubing comprising:

a central block having connection faces thereon, each of the connection faces having a projection extending perpendicular to the respective connection face, said projection having an adjacent section adapted to match exterior dimensions of the tubing to be connected thereto and a distal section having corners adapted to fit inside the tubing, said projection having a central bore extending through said adjacent and distal sections and radial holes formed in the distal section extending from the central bore to the corners of the distal section;

a slidable transverse cam disposed in the central bore of the adjacent section of the projection, a screw disposed in the adjacent section of the projection perpendicular to the axis of the central bore and in engagement with the transverse cam for sliding the transverse cam in a direction perpendicular to the axis of the central bore;

a slidable axial cam disposed in the adjacent and distal sections of the central bore and in engagement with the transverse cam for sliding the axial cam in a direction parallel to the axis of the central bore; and slidable pins disposed in the distal section and extending outward through the radial holes upon the sliding of the axial cam.

2. The connector of claim 1, wherein said slidable pins consist of four slidable pins having sufficient length to provide angular restraint for the tubing.

3. The connector of claim 1, wherein said slidable pins consist of four slidable pins disposed proximal to the respective adjacent section and four slidable pins disposed distal to the adjacent section.

4. The connector of claim 1, wherein each of the slidable pins has a pointed portion for penetrating an interior surface of the tubing.

5. The connector of claim 1, wherein each of the slidable pins has a resilient element for preloading the slidable pin away from the central block and parallel to the tubing.

* * * * *